United States Patent
Yang et al.

(10) Patent No.: US 11,594,006 B2
(45) Date of Patent: Feb. 28, 2023

(54) SELF-SUPERVISED HIERARCHICAL MOTION LEARNING FOR VIDEO ACTION RECOGNITION

(71) Applicant: NVIDIA Corporation, Santa Clara, CA (US)

(72) Inventors: Xiaodong Yang, Fremont, CA (US); Xitong Yang, Rockville, MD (US); Sifei Liu, Santa Clara, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 162 days.

(21) Appl. No.: 16/998,914

(22) Filed: Aug. 20, 2020

(65) Prior Publication Data
US 2021/0064931 A1    Mar. 4, 2021

Related U.S. Application Data

(60) Provisional application No. 62/892,118, filed on Aug. 27, 2019.

(51) Int. Cl.
*G06V 10/34* (2022.01)
*G06K 9/62* (2022.01)
*G06N 3/04* (2006.01)
*G06V 10/40* (2022.01)
*G06N 3/088* (2023.01)
(Continued)

(52) U.S. Cl.
CPC ........... *G06V 10/34* (2022.01); *G06K 9/6256* (2013.01); *G06K 9/6259* (2013.01); *G06K 9/6262* (2013.01); *G06N 3/04* (2013.01); *G06N 3/088* (2013.01); *G06V 10/40* (2022.01); *G06V 20/46* (2022.01); *G06V 30/274* (2022.01)

(58) Field of Classification Search
CPC ........ G06V 10/34; G06V 20/46; G06V 10/40; G06V 30/274; G06K 9/6256; G06K 9/6259; G06K 9/6262; G06N 3/04; G06N 3/088
See application file for complete search history.

(56) References Cited

U.S. PATENT DOCUMENTS

| | | | | |
|---|---|---|---|---|
| 10,872,293 | B2 * | 12/2020 | Dunning | G06N 3/126 |
| 10,929,987 | B2 * | 2/2021 | Lv | G06T 3/0093 |
| 11,157,764 | B2 * | 10/2021 | Wang | G06V 20/35 |

(Continued)

OTHER PUBLICATIONS

Liao, Jian, et al. "Multiscale cascaded scene-specific convolutional neural networks for background subtraction." Pacific Rim Conference on Multimedia. Springer, Cham, 2018. (Year: 2018).*

(Continued)

*Primary Examiner* — Utpal D Shah
(74) *Attorney, Agent, or Firm* — Zilka-Kotab, P.C.

(57) ABSTRACT

There are numerous features in video that can be detected using computer-based systems, such as objects and/or motion. The detection of these features, and in particular the detection of motion, has many useful applications, such as action recognition, activity detection, object tracking, etc. The present disclosure provides a neural network that learns motion from unlabeled video frames. In particular, the neural network uses the unlabeled video frames to perform self-supervised hierarchical motion learning. The present disclosure also describes how the learned motion can be used in video action recognition.

16 Claims, 7 Drawing Sheets

(51) Int. Cl.
  *G06V 20/40* (2022.01)
  *G06V 30/262* (2022.01)

(56) References Cited

U.S. PATENT DOCUMENTS

| | | | | |
|---|---|---|---|---|
| 11,282,509 | B1* | 3/2022 | Li | G06N 20/00 |
| 2018/0124425 | A1* | 5/2018 | Van Leuven | H04N 19/513 |
| 2018/0247200 | A1* | 8/2018 | Rolfe | G06N 3/088 |
| 2021/0383169 | A1* | 12/2021 | Wang | G06K 9/6257 |
| 2022/0084272 | A1* | 3/2022 | Wang | G06T 7/20 |

OTHER PUBLICATIONS

Han, Tengda, Weidi Xie, and Andrew Zisserman. "Video representation learning by dense predictive coding." Proceedings of the IEEE/CVF International Conference on Computer Vision Workshops. 2019. (Year: 2019).*
Lorre, Guillaume, et al. "Contrastive predictive coding for video representation learning." ICML2019—36th International Conference on Machine Learning-Workshop on Self-Supervised Learning. 2019. (Year: 2019).*
Soomro et al., "UCF101: A Dataset of 101 Human Actions Classes From Videos in The Wild," Center for Research in Computer Vision, University of Central Florida, Nov. 2012, 7 pages.
Srivastava et al., "Unsupervised Learning of Video Representations using LSTMs," Proceedings of the 32nd International Conference on Machine Learning, 2015, 10 pages.
Stroud et al., "D3D: Distilled 3D Networks for Video Action Recognition," arXiv, 2018, pp. 1-13, retrieved from https://arxiv.org/pdf/1812.08249v1.pdf.
Sun et al., "A Quantitative Analysis of Current Practices in Optical Flow Estimation and the Principles Behind Them," International Journal of Computer Vision (IJCV), 2014, pp. 115-137.
Vondrick et al., "Anticipating Visual Representations from Unlabeled Video," CVPR, 2016, pp. 98-106, retrieved from https://www.cv-foundation.org/openaccess/content_cvpr_2016/papers/Vondrick_Anticipating_Visual_Representations_CVPR_2016_paper.pdf.
Wang et al., "Action Recognition with Improved Trajectories, "IEEE International Conference on Computer Vision (ICCV), Dec. 2013, 9 pages.
Wang et al., "Non-local Neural Networks," CVPR, 2018, pp. 7794-7803, retrieved from https://openaccess.thecvf.com/content_cvpr_2018/papers/Wang_Non-Local_Neural_Networks_CVPR_2018_paper.pdf.
Wu et al., "Unsupervised Feature Learning via Non-Parametric Instance Discrimination," CVPR, 2018, 10 pages, retrieved from https://openaccess thecvf.com/content_cvpr_2018/CameraReady/0801.pdf.
Xie et al., "Deep3D: Fully Automatic 2D-to-3D Video Conversion with Deep Convolutional Neural Networks," ECCV, 2016, pp. 1-15, retrieved from https://www.semanticscholar.org/paper/Deep3D%3A-Fully-Automatic-2D-to-3D-Video-Conversion-Xie-Girshick/28fc7e119ec7d3bd0cf7988a0aa6cdfad1152b31.
Xie et al., "Rethinking Spatiotemporal Feature Learning: Speed-Accuracy Trade-offs in Video Classification," ECCV, 2018, pp. 1-17.
Yang et al., "Making Convolutional Networks Recurrent for Visual Sequence Learning," IEEE Conference on Computer Vision and Pattern Recognition (CPVR), 2018, pp. 6469-6478, retrieved from https://openaccess.thecvf.com/content_cvpr_2018/html/Yang_Making_Convolutional_Networks_CVPR_2018_paper.html.
Zach et al., "A Duality Based Approach for Realtime TV-L1 Optical Flow," DAGM, 2007, pp. 214-223.
Zhang et al., "Slow Feature Analysis for Human Action Recognition," IEEE Transactions on Pattern Analysis and Machine Intelligence, vol. 34, No. 3, Mar. 2012, pp. 436-450.
Zhao et al., "Recognize Actions by Disentangling Components of Dynamics," CVPR, 2018, pp. 6566-6575, retrieved from https://openaccessthecvf.com/content_cvpr_2018/papers/Zhao_Recognize_Actions_by_CVPR_2018_paper.pdf.
Zhou et al., "Temporal Relational Reasoning in Videos," ECCV, 2018, pp. 1-16.
Zhou et al., "View Synthesis by Appearance Flow," ECCV, 2016, pp. 1-16, retrieved from https://people.eecs.berkeley.edu/~tinghuiz/papers/eccv16_appflow.pdf.
Zhu et al., "Hidden Two-stream Convolutional Networks for Action Recognition," ACCV, 2018, pp. 363-378.
Zolfaghari et al., "ECO: Efficient Convolutional Network for Online Video Understanding," ECCV, 2018, pp. 1-18.
Simonyan et al., "Two-Stream Convolutional Networks for Action Recognition in Videos," Proceedings of the 27th International Conference on Neural Information Processing Systems, 2014, pp. 1-9, retrieved from https://papers.nips.cc/paper/5353-two-stream-convolutional-networks-for-action-recognition-in-videos.pdf.
Carreira et al., "Quo Vadis, Action Recognition? A New Model and the Kinetics Dataset," CVPR, 2017, pp. 6299-6308, retrieved from https://openaccess.thecvf.com/content_cvpr_2017/papers/Carreira_Quo_Vadis_Action_CVPR_2017_paper.pdf.
Brox et al., "High Accuracy Optical Flow Estimation Based on a Theory for Warping," Proceedings of the 8th European Conference on Computer Vision, May 2004, 12 pages.
Tran et al., "Learning Spatiotemporal Features with 3D Convolutional Networks," ICCV, 2015, pp. 4489-4497, retrieved from https://www.cv-foundation.org/openaccess/content_iccv_2015/papers/Tran_Learning_Spatiotemporal_Features_ICCV_2015_paper.pdf.
Tran et al., "A Closer Look at Spatiotemporal Convolutions for Action Recognition," CVPR, 2018, pp. 6450-6459, retrieved from https://openaccess.thecvf.com/content_cvpr_2018/papers/Tran_A_Closer_Look_CVPR_2018_paper.pdf.
Sun et al., "PWC-Net: CNNs for Optical Flow Using Pyramid, Warping, and Cost Volume," CVPR, 2018, pp. 8934-8943, retrieved from https://openaccess.thecvf.com/content_cvpr_2018/papers/Sun_PWC-Net_CNNs_for_CVPR_2018_paper.pdf.
Sevilla-Lara, et al., "On the Integration of Optical Flow and Action Recognition," German Conference on Pattern Recognition, 2018, pp. 1-16.
Bill et al., "Hierarchical structure is employed by humans during visual motion perception," bioRxiv preprint, Sep. 5, 2019, 21 pages.
Chattopadhyay et al., "Grad-CAM++: Improved Visual Explanations for Deep Convolutional Networks," arXiv, 2018, 14 pages, retrieved from https://arxiv.org/pdf/1710.11063v3.pdf.
Chen et al., "A Simple Framework for Contrastive Learning of Visual Representations," arXiv, 2020, 20 pages, retrieved from https://arxiv.org/pdf/2002.05709.pdf.
Chopra et al., "Learning a Similarity Metric Discriminatively, with Application to Face Verification," IEEE Computer Society Conference on Computer Vision and Pattern Recognition (CPVR), 2005, 9 pages.
Crasto et al., "MARS: Motion-Augmented RGB Stream for Action Recognition," CPVR, 2019, pp. 7882-7891, retrieved from https://openaccess.thecvf.com/content_CVPR_2019/papers/Crasto_MARS_Motion-Augmented_RGB_Stream_for_Action_Recognition_CVPR_2019_paper.pdf.
Diba et al., "DynamoNet: Dynamic Action and Motion Network," Proceedings of the IEEE/CVF International Conference on Computer Vision (ICCV), 2019, pp. 6192-6201, retrieved from https://openaccess.thecvf.com/content_ICCV_2019/papers/Diba_DynamoNet_Dynamic_Action_and_Motion_Network_ICCV_2019_paper.pdf.
Dosovitskiy et al., "FlowNet: Learning Optical Flow with Convolutional Networks," ICCV, 2015, pp. 2758-2766, retrieved from https://www.cv-foundation.org/openaccess/content_iccv_2015/papers/Dosovitskiy_FlowNet_Learning_Optical_ICCV_2015_paper.pdf.
Fan et al., "End-to-End Learning of Motion Representation for Video Understanding," CPVR, 2018, pp. 6016-6025, retrieved from https://openaccess.thecvf.com/content_cvpr_2018/papers/Fan_End-to-End_Learning_of_CVPR_2018_paper.pdf.
Feichtenhofer et al., "SlowFast Networks for Video Recognition," ICCV, 2019, pp. 6202-6211, retrieved from https://openaccess.thecvf.com/content_ICCV_2019/papers/Feichtenhofer_SlowFast_Networks_for_Video_Recognition_ICCV_2019_paper.pdf.

(56) References Cited

OTHER PUBLICATIONS

Feichtenhofer et al., "Convolutional Two-Stream Network Fusion for Video Action Recognition," CVPR, 2016, 9 pages, retrieved from https://feichtenhofer.github.io/pubs/Feichtenhofer_Two_Stream_Fusion_2016_CVPR.pdf.
Feichtenhofer et al., "Detect to Track and Track to Detect," ICCV, 2017, pp. 3038-3046, retrieved from https://openaccess.thecvf.com/content_ICCV_2017/papers/Feichtenhofer_Detect_to_Track_ICCV_2017_paper.pdf.
Fernando et al., "Self-Supervised Video Representation Learning With Odd-One-Out Networks," CVPR, 2017, pp. 3636-3645, retrieved from https://openaccess.thecvf.com/content_cvpr_2017/papers/Fernando_Self-Supervised_Video_Representation_CVPR_2017_paper.pdf.
Giese et al., "Neural Mechanisms for the Recognition of Biological Movements," Nature Reviews Neuroscience, vol. 1, Mar. 2003, pp. 179-192.
Goyal et al., "Accurate, Large Minibatch SGD: Training ImageNet in 1 Hour," arXiv, 2017, pp. 1-12, retrieved from https://arxiv.org/pdf/1706.02677v1.pdf.
Goyal et al., "The "something something" video database for learning and evaluating visual common sense," ICCV, 2017, pp. 5842-5850, retrieved from https://openaccess.thecvf.com/content_ICCV_2017/papers/Goyal_The_Something_Something_ICCV_2017_paper.pdf.
Gu et al., "AVA: A Video Dataset of Spatio-temporally Localized Atomic Visual Actions," CVPR, 2018, pp. 6047-6056, retrieved from https://openaccess.thecvf.com/content_cvpr_2018/papers/Gu_AVA_A_Video_CVPR_2018_paper.pdf.
Gutman et al., "Noise-contrastive estimation: A new estimation principle for unnormalized statistical models," Proceedings of the 13th International Conference on Artificial Intelligence and Statistics (AISTATS), 2010, pp. 297-304.
Hadsell et al., "Dimensionality Reduction by Learning an Invariant Mapping," Proceedings of IEEE Computer Society Conference on Computer Vision and Pattern Recognition (CPVR), Feb. 2006, 9 pages.
Han et al., "Video Representation Learning by Dense Predictive Coding," ICCV, 2019, pp. 1-13, retrieved from http://www.robots.ox.ac.uk/~vgg/publications/2019/Han19/.
Hara et al., "Can Spatiotemporal 3D CNNs Retrace the History of 2D CNNs and ImageNet?," CVPR, 2018, pp. 5546-6555, retrieved from https://openaccess.thecvf.com/content_cvpr_2018/papers/Hara_Can_Spatiotemporal_3D_CVPR_2018_paper.pdf.
He et al., "Momentum Contrast for Unsupervised Visual Representation Learning," arXiv, 2019, 11 pages, retrieved from https://arxiv.org/pdf/1911.05722v2.pdf.
He et al., "Deep Residual Learning for Image Recognition," CVPR, 2016, pp. 770-778, retrieved from https://www.cv-foundation.org/openaccess/content_cvpr_2016/papers/He_Deep_Residual_Learning_CVPR_2016_paper.pdf.
Rhemann et al., "Fast Cost-Volume Filtering for Visual Correspondence and Beyond," IEEE Transactions on Software Engineering , Jul. 2012, pp. 3017-3024.
Janai et al., "Unsupervised Learning of Multi-Frame Optical Flow with Occlusions," ECCV, 2018, pp. 1-17, retrieved from http://www.cvlibs.net/publications/Janai2018ECCV.pdf.
Yu et al., "Back to Basics: Unsupervised Learning of Optical Flow via Brightness Constancy and Motion Smoothness," European Conference on Computer Vision (ECCV), Oct. 8, 2016, pp. 1-4, retrieved from https://scholar.google.com/citations?user=RaKQsQ0AAAAJ&hl=en#d=gs_md_cita-d&u=%2Fcitations%3Fview_op%3Dview_citation%26hl%3Den%26user%3DRaKQsQoAAAAJ%26citation_for_view%3DRaKQsQoAAAAJ%3Au-x6o8ySG0sC%26tzom%3D420.
Jiang et al., "STM: SpatioTemporal and Motion Encoding for Action Recognition," ICCV, 2019, pp. 2000-2009, retrieved from https://openaccess.thecvf.com/content_ICCV_2019/papers/Jiang_STM_SpatioTemporal_and_Motion_Encoding_for_Action_Recognition_ICCV_2019_paper.pdf.
Kalogeiton et al., "Action Tubelet Detector for Spatio-Temporal Action Localization," IEEE International Conference on Computer Vision (ICCV), Oct. 2017, 11 pages.
Lee et al., "Unsupervised Representation Learning by Sorting Sequences," ICCV, 2017, pp. 667-676, retrieved from https://openaccess.thecvf.com/content_ICCV_2017/papers/Lee_Unsupervised_Representation_Learning_ICCV_2017_paper.pdf.
Lin et al., "TSM: Temporal Shift Module for Efficient Video Understanding," ICCV, 2019, pp. 7083-7093, retrieved from https://openaccess.thecvf.com/content_ICCV_2019/papers/Lin_TSM_Temporal_Shift_Module_for_Efficient_Video_Understanding_ICCV_2019_paper.pdf.
Liu, C., "Beyond Pixels: Exploring New Representations and Applications for Motion Analysis," Ph.D. Thesis, Massachusetts Institute of Technology, 2009, pp. 1-164.
Long et al., "Learning Image Matching by Simply Watching Video," ECCV, 2016, pp. 434-450.
Lotter et al., "Deep Predictive Coding Networks for Video Prediction and Unsupervised Learning," arXiv, 2016, 12 pages, retrieved from https://arxiv.org/pdf/1605.08104v4.pdf.
Lu et al., "RetinaTrack: Online Single Stage Joint Detection and Tracking," CVPR, 2020, pp. 14668-14678.
Mahasseni et al., "Budget-Aware Activity Detection with A Recurrent Policy Network," BMVC, 2018, pp. 1-12, retrieved from http://bmvc2018.org/contents/papers/0242.pdf.
Mathieu et al., "Deep Multi-Scale Video Prediction Beyond Mean Square Error," arXiv, 2015, pp. 1-11, retrieved from https://arxiv.org/pdf/1511.05440v3.pdf.
Misra et al., "Shuffle and Learn: Unsupervised Learning using Temporal Order Verification," arXiv, 2016, pp. 1-21, retrieved from https://arxiv.org/abs/1603.08561.
Ng et al., "ActionFlowNet: Learning Motion Representation for Action Recognition," arXiv, 2018, 9 pages, retrieved from https://arxiv.org/abs/1612.03052.
Ng et al., "Beyond Short Snippets: Deep Networks for Video Classification," CPVR, 2015, pp. 4694-4702.
Niklaus et al., "Context-aware Synthesis for Video Frame Interpolation," CVPR, 2018, pp. 1701-1710, retrieved from https://openaccess.thecvf.com/content_cvpr_2018/papers/Niklaus_Context-Aware_Synthesis_for_CVPR_2018_paper.pdf.
Oord et al., "Representation Learning with Contrastive Predictive Coding," arXiv, 2018, pp. 1-13, retrieved from https://arxiv.org/pdf/1807.03748v1.pdf.
Piergiovanni et al., "Representation Flow for Action Recognition," CVPR, 2019, pp. 9945-9953, retrieved from https://openaccess.thecvf.com/content_CVPR_2019/papers/Piergiovanni_Representation_Flow_for_Action_Recognition_CVPR_2019_paper.pdf.
Ren et al., "Unsupervised Deep Learning for Optical Flow Estimation," Proceedings of the Thirty-First AAAI Conference on Artificial Intelligence, 2017, pp. 1495-1501.
Sevilla-Lara et al., "Only Time Can Tell: Discovering Temporal Data for Temporal Modeling," arXiv, 2019, pp. 1-11, retrieved from https://arxiv.org/abs/1907.08340.

\* cited by examiner

SELF-SUPERVISED HIERARCHICAL MOTION LEARNING FOR VIDEO ACTION RECOGNITION

CLAIM OF PRIORITY

This application claims the benefit of U.S. Provisional Application No. 62/892,118 titled "CROSS-DOMAIN DISENTANGLEMENT AND ADAPTATION FOR PERSON RE-IDENTIFICATION AND UNARY-STEAM NETWORK FOR VIDEO ACTION RECOGNITION," filed Aug. 27, 2019, the entire contents of which is incorporated herein by reference.

TECHNICAL FIELD

The present disclosure relates to detecting motion in video.

BACKGROUND

There are numerous features in video that can be detected using computer-based systems, such as objects and/or motion. The detection of these features, and in particular the detection of motion, has many useful applications. For example, a broad range of video understanding tasks can benefit from the introduction of motion information, such as action recognition, activity detection, object tracking, etc.

While early techniques developed to detect motion relied on the off-the-shelf pre-computed motion features (e.g., optical flow), more recent techniques directed towards action recognition have relied upon convolutional neural networks (CNNs) for more effective motion learning from raw video frames. Some of these recent techniques rely on supervised learning to train the networks, such that the accuracy of the network is a function of the quality of the training data (i.e. annotated video) that is available. However, difficulty in annotating motion in video limits the quality of available training data. On the other hand, recent techniques that use unsupervised learning processes do not effectively catch the high-level and long-term temporal dynamics.

There is a need for addressing these issues and/or other issues associated with the prior art.

SUMMARY

A method, computer readable medium, and system are disclosed for self-supervised hierarchical motion learning, which can be used for video action recognition. In use, a plurality of unlabeled video frames is accessed. Further, self-supervised motion learning is performed by a neural network, using the unlabeled video frames.

DETAILED DESCRIPTION

Figure 1:
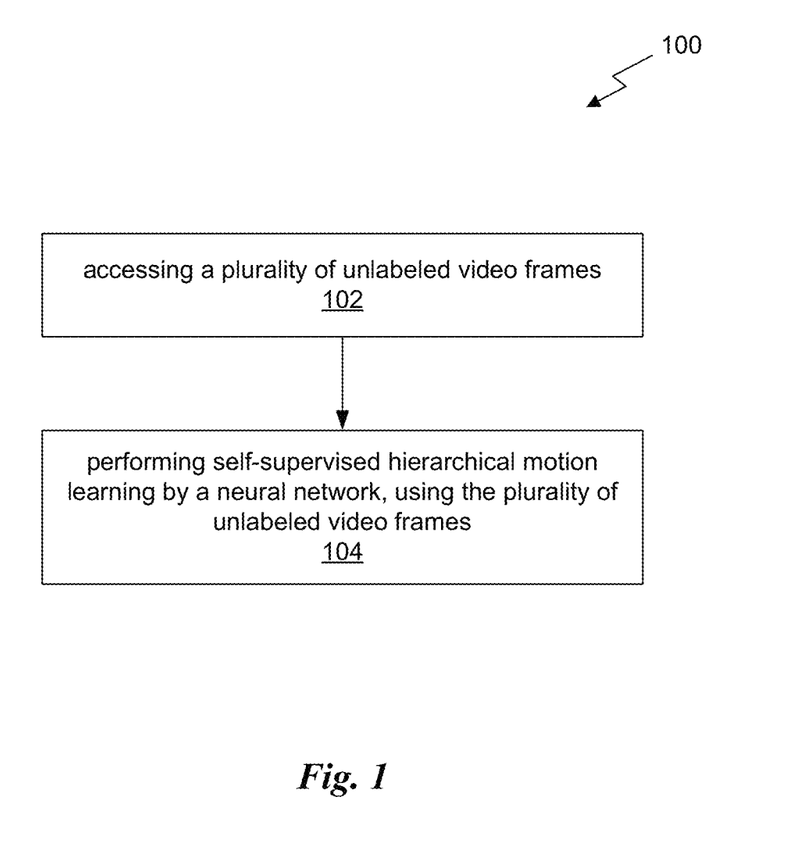
FIG. 1 illustrates a flowchart of a method for self-supervised hierarchical motion learning, in accordance with an embodiment.

FIG. 1 illustrates a flowchart of a method 100 for self-supervised hierarchical motion learning, in accordance with an embodiment. Each operation of method 100, described herein, comprises a computing process that may be performed using any combination of hardware, firmware, and/or software. For instance, various functions may be carried out by a processor executing instructions stored in memory. The method 100 may also be embodied as computer-usable instructions stored on computer storage media. The method 100 may be provided by a standalone application, a service or hosted service (standalone or in combination with another hosted service), or a plug-in to another product, to name a few. In addition, method 100 may be executed by any one system, or any combination of systems, including, but not limited to, those described herein.

In operation 102, a plurality of unlabeled video frames is accessed. The unlabeled video frames may be accessed from any computer storage storing the unlabeled video frames. In the context of the present description, the video frames are a continuous sequence of frames from a single video. Additionally, the video frames are unlabeled in terms of motion within the video (i.e. are not annotation with motion information).

Further, in operation 104, self-supervised hierarchical motion learning is performed by a neural network, using the unlabeled video frames. In other words, the neural network learns motion features, such as type of motion, direction of motion, etc. from the unlabeled video frames.

In one embodiment, the self-supervised motion learning learns a hierarchy of motion representations. The hierarchy includes multiple levels each having an increasing level of detail for the motion representations. Accordingly, the self-supervised motion learning may progressively learn, for each level of the hierarchy in a bottom-up manner, motion representations that include motion features at increasing level of abstraction.

In another embodiment, the self-supervised motion learning may be initialized with a preliminary motion features derived from the unlabeled video frames. These preliminary motion features may be determined from the plurality of unlabeled video frames in a self-supervised manner. For example, the preliminary motion features may be determined by applying video frame reconstruction to the plurality of unlabeled video frames. To this end, the motion features at the first level in the hierarchy may be the preliminary motion features.

In a further embodiment, at each level above the first level in the hierarchy, motion features for the level may be learned based on the motion features at a previous level. In particular, the motion features for the current level may be learned by enforcing the motion features to predict future motion features at the previous level. In yet another embodiment, a discriminative contrastive loss may be used as an objective, such that the current level is trained to capture semantic temporal dynamics from the previous level.

Once the motion features are learned, the motion features may be used for any desired application requiring motion representation, such as for video game applications or other computer vision applications. In one embodiment, action recognition learning (by the neural network) may be performed using the learned motion features. The action recognition learning may be performed by integrating the learned motion features into a backbone network. The learned motion features may be integrated with appearance features. In this way, the integration may enable end-to-end fusion of appearance and motion information over multiple levels throughout a single unified network, instead of learning them disjointly, for use in action recognition.

More illustrative information will now be set forth regarding various optional architectures and features with which the foregoing framework may be implemented, per the desires of the user. For example, while an exemplary backbone network is shown, other embodiments are contemplated in which various backbone networks can be used. It should be strongly noted that the following information is set forth for illustrative purposes and should not be construed as limiting in any manner. Any of the following features may be optionally incorporated with or without the exclusion of other features described.

The embodiments described below provide a self-supervised learning framework, which can enable explicit motion supervision at multiple feature abstraction levels, or in other words which can provide hierarchical contrastive motion learning. Specifically, given preliminary motion features (also referred to as cues) as a bootstrap, the approach can progressively learn a hierarchy of motion features in a bottom-up manner. To acquire the preliminary motion cues to initialize the hierarchical motion learning, video frame reconstruction may be used as an auxiliary task such that the whole motion representation learning is provided by a unified self-supervised setup.

This hierarchical design can bridge the semantic gap between the low-level preliminary motion and the high-level recognition task. At each level, a discriminative contrastive loss may be used to provide an explicit self-supervision to enforce the motion features at a current level to predict the future ones at previous level. In contrast to pretext tasks that focus on low-level image details, the contrastive learning may encourage the model to learn useful semantic dynamics from previously learned motion features at a lower level, and therefore may be more favorable for motion learning at higher levels where the spatial and temporal resolutions of feature maps are low.

Just by way of example, a low level of the hierarchy may indicate only that some pixels are moving between video frames; a mid level of the hierarchy may indicate which object(s) in the frames is/are moving; and a high level of the hierarchy may indicate a direction of the movement (e.g. the two objects are moving closer together). As another example, a low level of the hierarchy may indicate only that some pixels are moving between video frames; a mid level of the hierarchy may indicate which object(s) in the frames is/are moving and a direction of the movement (e.g. the object is moving upwards); and a high level of the hierarchy may indicate a complete movement of the object (e.g. the object is being turned upside down).

As described in further detail below, the proposed motion learning module may be realized via a side network branch, which is lightweight and flexible to embed into a variety of backbone CNNs. In particular, the hierarchical design may promote the appearance and motion fusion by integrating the learned motion features into the backbone network at multiple abstraction levels. Such a multi-level fusion paradigm is unachievable for previous motion learning methods that depend solely on low-level motion supervisions. It is also noteworthy that this approach only introduces a small overhead to the computation of a backbone network at inference time.

To this end, embodiments of the present disclosure may (1) provide a new learning framework for motion representation learning from raw (i.e. unlabeled) video frames; (2) advance contrastive learning to a hierarchical design, and empower contrastive learning in motion representation learning for large-scale video action recognition; and (3) achieve superior results without relying on off-the-shelf motion features or supervised pre-training.

Figure 2A:
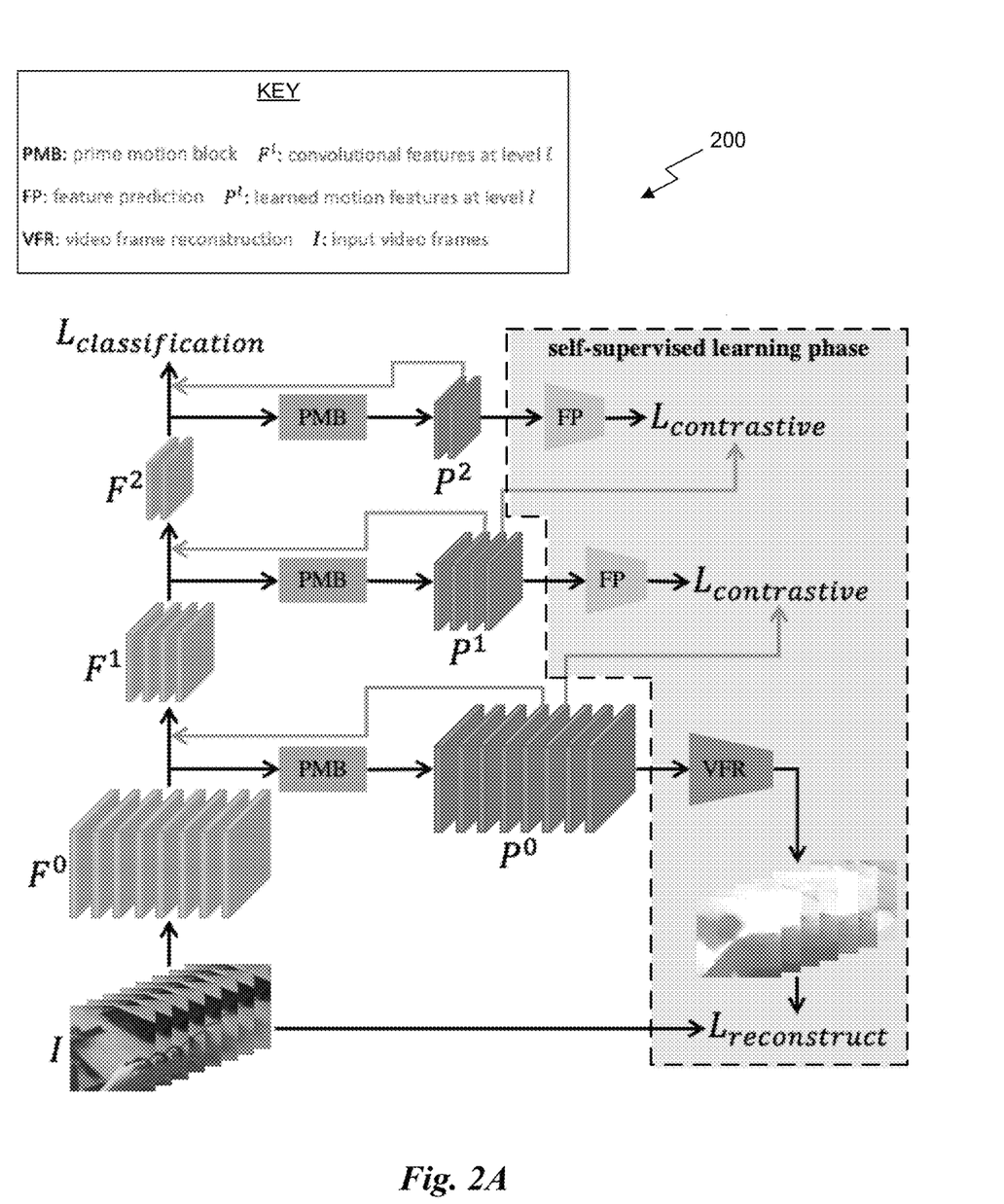
FIG. 2A illustrates the architecture of a motion learning module embedded in a backbone network, in accordance with an embodiment.

FIG. 2A illustrates the architecture of a motion learning module 200 embedded in a backbone network, in accordance with an embodiment.

The convolutional features at different levels of the backbone network are denoted as, $\{\mathcal{F}, \ldots, \mathcal{F}^{L-1}\}$, where L is the number of abstraction levels. The goal is to learn a hierarchy of motion representations $\{\mathcal{P}^0, \ldots, \mathcal{P}^{L-1}\}$ that correspond to the different levels. As a first step, video frame reconstruction is used to obtain the preliminary motion cues $\mathcal{P}^0$, which function as a bootstrap for the following hierarchical motion learning. With that, the motion features are progressively learned in a bottom-up manner. At each level $l>0$, the motion features $\mathcal{P}^l$ are learned by enforcing them to predict the future motion features at the previous level $\mathcal{P}^{l-1}$, as described below. Contrastive loss $L_{contrastive}$ is used as an objective so that $\mathcal{P}^l$ is trained to capture semantic temporal dynamics from $\mathcal{P}^{l-1}$.

It should be noted that the side branches (i.e., the boxed region of FIG. 2A) for self-supervised motion learning may be discarded after training, and only the learned motion features may be retained in the form of residual connections. The learned motion features at each level may be integrated into the backbone network via residual connections to perform appearance and motion feature fusion: $\mathcal{Z}^l < \mathcal{F}^l + g^l$ ($\mathcal{P}^l$), where $g^l(\cdot)$ is used to match the feature dimensions. After learning motion at all levels, the whole network can be jointly trained for action recognition in a multi-tasking manner, as described below. Compared with the prior art two-stream methods that require an additional temporal stream operating on the pre-computed optical flow, the present approach is capable of boosting action recognition with a minor computational increase.

Prime Motion Block

Figure 2B:
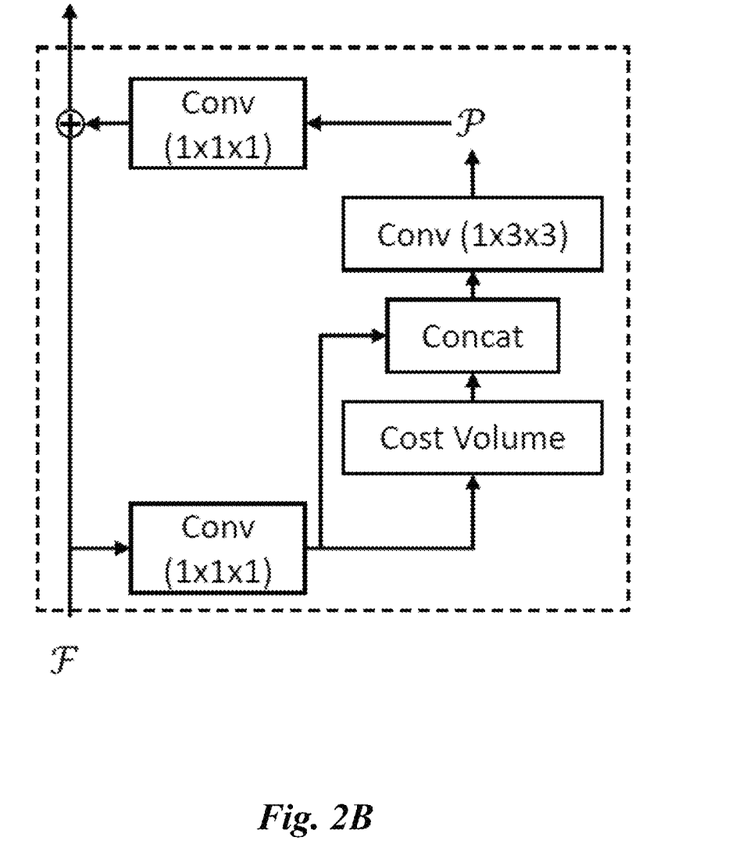
FIG. 2B illustrates a block diagram of the prime motion block of FIG. 2A, in accordance with an embodiment.

A lightweight prime motion block (PMB) is used to transform the convolutional features of the backbone network to more discriminative representations for motion learning. The key component of this block is a cost volume layer. A cost volume is initially used to store the costs that measure how well a pixel in one frame matches other pixels in another frame to catch the inter-frame pixel-wise relations that indicate the rough motion.

Given a sequence of convolutional features $\mathcal{F} = \{F_0, \ldots, F_{T-1}\}$ with length T, first a 1×1×1 convolution is conducted to reduce the input channels by 1/β, denoted as $\tilde{\mathcal{F}}$. This operation significantly reduces the computational overhead of prime motion block, and provides more compact representations to reserve the essential information to compute cost volumes. The adjacent features are then reorganized to feature pairs $\tilde{\mathcal{F}}^* = \{(\tilde{F}_0, \tilde{F}_1), \ldots, (\tilde{F}_{T-2}, \tilde{F}_{T-1})\}$, $\{\tilde{F}_{T-1}, \tilde{F}_{T-1}\}$, which is used to construct the cost volumes. The matching cost between two features is defined using the equation shown in Equation 1.

$$cv_t(x_1,y_1,x_2,y_2)=\text{sim}(\tilde{F}_t(x_1,y_1),\tilde{F}_{t+1}(x_2,y_2))$$

where $\tilde{F}_t(x, y)$ denotes the feature vector at time t and position (x, y), and the cosine distance is used as the similarity function: $\text{sim}^*u, v)=u^T v/\|u\|\,\|v\|$. Note that the last feature map $\tilde{F}_{T-1}$ is replicated to compute their cost volume in order to keep the original temporal resolution.

While constructing a full cost volume over the whole feature map is computationally expensive, a "partial" cost volume is constructed. The search range is limited with the max displacement of $(x_2, y_2)$ to be d and a striding factor s is used to handle large displacements without increasing the computation. As a result, the cost volume layer outputs a feature tensor of size M×H×W, where $M=(2\times\lfloor d/s\rfloor+1)^2$ and H, W denote the height and width of a feature map. It is noteworthy that computing cost volumes is lightweight as it has no learnable parameters and much fewer FLOPs than 3D convolutions. Finally, the cost volumes are combined with the features obtained after dimension reduction, motivated by the observation that these two features provide complementary information for localizing the motion boundaries.

FIG. 2B illustrates a block diagram of the prime motion block of FIG. 2A, in accordance with an embodiment.

As shown, the prime motion block is wrapped as a residual block such that the motion features $\mathcal{P}$ can be inserted into the backbone network seamlessly. For the cost volume layer, in one embodiment the search range is limited with the maximum displacement d=6 and the stride s=2, which is equivalent to covering a region of 13×13 pixels with a stride 2. To combine the complementary information provided by the cost volumes and the convolutional features (after dimension reduction), the two features are concatenated in channels and then a 2D convolution is performed. Batch normalization and rectified linear unit (ReLU) may be used after each convolutional layer and cost volume layer.

Figure 3:
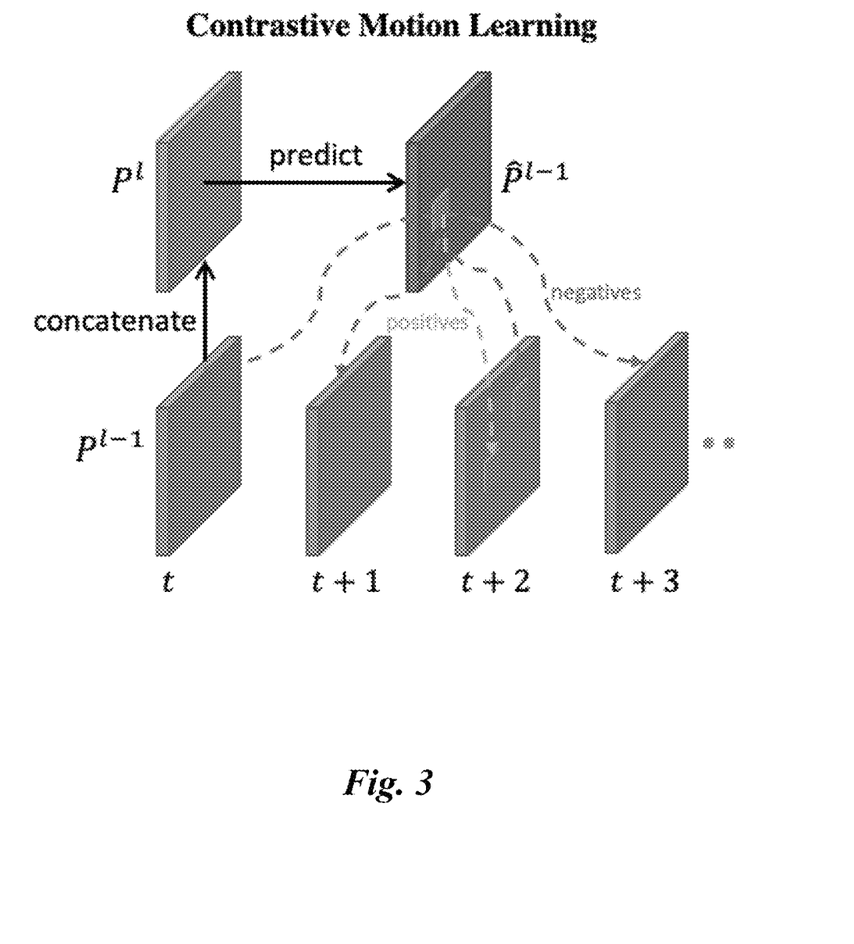
FIG. 3 illustrates a block diagram of contrastive motion learning, in accordance with an embodiment.

FIG. 3 illustrates a block diagram of contrastive motion learning, in accordance with an embodiment.

Although the prime motion block extracts rough motion features from convolutional features, such features may be easily biased towards appearance information when jointly trained with the backbone network. Thus, an explicit motion supervision may be of vital importance for more effective motion learning at each level.

To this end, a multi-level self-supervised objective based on the contrastive loss may be used. The goal is to employ the higher-level motion features as a conditional input to guide the prediction of the future lower-level motion features that are well-learned from a previous step. In this way, the higher-level features are forced to understand a more abstract trajectory that summarizes motion dynamics from the lower-level ones. This objective therefore allows varying features which progressively correspond to high-level semantic concepts to be extracted slowly.

Formally, the motion features generated by the prime motion block at level l>0 may be denoted as $\mathcal{P}^l = \{P_0^l, \ldots, P_{T-1}^l\}$, where T indicates the sequence length. In order to train $\mathcal{P}^l$, we enforce $P_t^l$ to predict the future motion features at the previous level (i.e., $P_{>t}^{l-1}$), conditioned on the motion feature at the start time $P_t^{l-1}$, as illustrated in FIG. 3. In practice, a predictive function $f_\delta$ is applied for the motion feature prediction at time step t+δ: $\hat{P}_{t+\delta}^{l-1}=f_\delta([P_t^l, P_t^{l-1}])$, where [·,·] denotes channel-wise concatenation. A multi-layer perception with one hidden layer is used for the prediction function: $f_\delta(x)=W_\delta^{(2)}\sigma(W^{(1)}x)$, where σ is ReLU and $W^{(1)}$ is shared across all prediction steps for leveraging their common information.

The objective function of each level is defined as a contrastive loss that encourages the predicted $\hat{P}^{l-1}$ to be close to the ground truth $P^{l-1}$ while being far away from the negative samples, as shown in Equation 2.

$$\mathcal{L}_{contrastive}^l = -\sum_{i\in S}\left[\log\frac{\exp(\text{sim}(\hat{P}_i^{l-1}, P_i^{l-1})/\tau)}{\sum_{j\in S}\exp(\text{sim}(\hat{P}_i^{l-1}, P_j^{l-1})/\tau)}\right] \quad \text{Equation 2}$$

where the similarity function is defined as the cosine similarity as the one used in computing cost volumes, and S denotes the sampling space of positive and negative samples. As shown in FIG. 3, the positive sample of the predicted feature is the ground-truth feature that corresponds to the same video and locates at the same position in both space and time as the predicted one. As for the negative samples, considering efficiency, N spatial locations are randomly sampled for each video within a mini-batch to compute the loss, so the number of spatial negatives, temporal negatives and easy negatives for a predicted feature are respectively: (N−1)T, (T−1) and (B−1)NT, where B is the batch size and T is the sequence length of ground-truth features.

With regard to the sampling strategy for contrastive motion learning, the predicted motion feature at level l is denoted as $\hat{P}_{t,k}^l$, where $t\in\{1, \ldots, T^l\}$ is the temporal index, and $k\in\{(1, 1), (1, 2), \ldots (H^l, W^l)\}$ is the spatial index. The only positive pair is $(\hat{P}_{t,k}^l, P_{t,k}^l)$, which is the ground-truth feature that corresponds to the same video and locates at the same position in both space and time as the predicted one. Three types of negative samples may be used for all the prediction and ground-truth pairs $(\hat{P}_{t, k}^l, P_{\tau, m}^l)$:

Spatial negatives are the ground-truth features that come from the same video of the predicted one but at a different spatial position, i.e., k≠m. Considering the efficiency, N spatial locations for each video within a mini-batch may be we randomly sampled to compute the loss. So the number of spatial negatives is $(N-1)T^l$.

Temporal negatives are the ground-truth features that come from the same video and same spatial position, but from different time steps, i.e., k=m, t≠τ. They are the hardest negative samples to classify, and the number of temporal negatives are $T^l-1$.

Easy negatives are the ground-truth features that come from different videos, and the number of easy negatives are $(B-1)NT^l$, where B is the batch size.

As illustrated in FIG. 2A, the contrastive motion learning is performed for multiple levels until the motion hierarchy of the whole network is built up.

Progressive Training

Training the multi-level self-supervised learning framework simultaneously from the beginning is infeasible, as the lower-level motion features are initially not well-learned and the higher-level prediction would be arbitrary. To facilitate the optimization process, a progressive training strategy is used that learns motion features for one level at a time, propagating from low-level to high-level. In practice, after the convergence of training at level l−1, we freeze all network parameters up to level l−1 (therefore fixing the motion features $\mathcal{P}^{l-1}$), and then start the training for level l.

In this way, the higher-level motion features can be stably trained with the well-learned lower-level ones.

Preliminary Motion Cues

To initialize the progressive training, the preliminary motion cues, i.e., $\mathcal{P}^0$, are required as a bootstrap. They may encode some low-level but valid movement information to facilitate the following motion learning. In one embodiment, video frame reconstruction may be used to guide the extraction of preliminary motion cues. This task can be formulated as a self-supervised optical flow estimation problem, aiming to produce optical flow to allow frame reconstruction from neighboring frames. A simple optical flow estimation module may be built using 5 convolutional layers that are stacked sequentially with dense connections. The optical flow output may be used to warp video frames through bilinear interpolation. The loss function consists of a photometric term that measures the error between the warped frame and the target frame, and a smoothness term that addresses the aperture problem that causes ambiguity in motion estimation: $\mathcal{L}_{reconstruct} = \mathcal{L}_{photometric} + \zeta \mathcal{L}_{smoothness}$. The photometric error is defined as shown in Equation 3.

$$\mathcal{L}_{photometric} = \frac{1}{HWT} \sum_{t=1}^{T} \sum_{x=1}^{W} \sum_{y=1}^{H} \mathbb{1}_{[m_{xy}=1]} \rho(I_t(x,y) - \hat{I}_t(x,y)) \quad \text{Equation 3}$$

where $\hat{I}_t$ indicates the warped frame at time t and $\rho(z) = (z^2 + \epsilon^2)^\alpha$ is the generalized Charbonnier penalty function with $\alpha=0.45$ and $\epsilon=1e^{-3}$. A binary mask m is used to indicate the positions of invalid warped pixels (i.e., out-of-boundary) and an indicator function $\mathbb{1}_{[m_{x,y}=1]} \in \{0, 1\}$ is applied to exclude those invalid positions. The smoothness term is computed as shown in Equation 4.

$$\mathcal{L}_{smoothness} = \frac{1}{T} \sum_{t=1}^{T} \rho(\nabla_x U_t) + \rho(\nabla_y U_t) + \rho(\nabla_x V_t) + \rho(\nabla_y V_t) \quad \text{Equation 4}$$

where $\nabla_x U/V$ and $\nabla_y U/V$ denote the gradients of estimated flow fields U/V in x/y directions.

Figure 4:
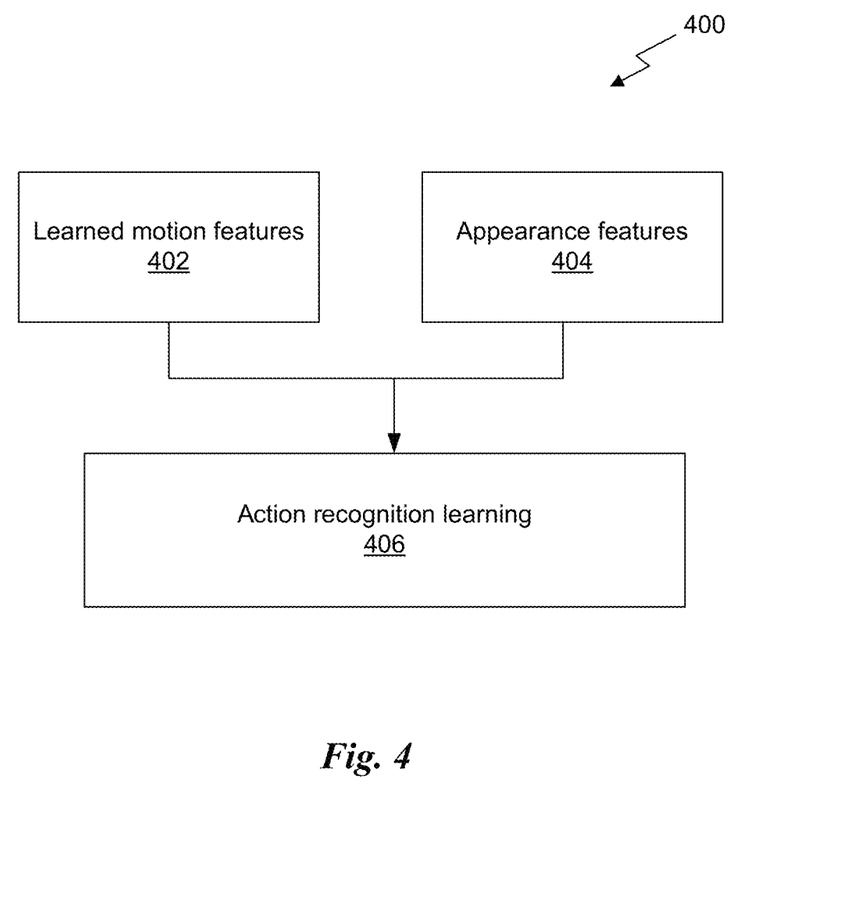
FIG. 4 illustrates a block diagram of a method for action recognition learning using learned motion and appearance features, in accordance with an embodiment.

FIG. 4 illustrates a block diagram of a method 400 for action recognition learning using learned motion and appearance features, in accordance with an embodiment.

As shown, both learned motion features 402 and appearance features 404 are integrated for action recognition learning 406.

One use of the learned hierarchical motion features is for improving video action recognition. To integrate the learned motion features into a backbone network, the prime motion block may be wrapped into a residual block: $\mathcal{Z}^l = \mathcal{F}^l + g^l(\mathcal{P}^l)$, where $\mathcal{F}^l$ is the convolutional features at level l, $\mathcal{P}^l$ is the corresponding motion features obtained as described above, and $g^l(\cdot)$ is a 1×1×1 convolution. This seamless integration enables end-to-end fusion of appearance and motion information over multiple levels throughout a single unified network, instead of learning them disjointly like two-stream networks. After the motion representations are self-supervised learned at all levels, the classification loss is added to jointly optimize the total objective, which is a weighted sum of the following losses shown in Equation 5.

$$\mathcal{L}_{total} = \mathcal{L}_{classification} + \lambda \mathcal{L}_{reconstruct} + \sum_l \gamma^l \mathcal{L}_{contrastive}^l \quad \text{Equation 5}$$

where $\lambda$ and $\gamma^l$ are the weights to balance related loss terms. As shown in FIG. 2A, the multi-level self-supervised learning is performed via a side network branch, which can be flexibly embedded into standard CNNs. Furthermore, this self-supervised learning side branch can be discarded after training so that the final network can well maintain the efficiency at runtime for inference.

Figure 5:
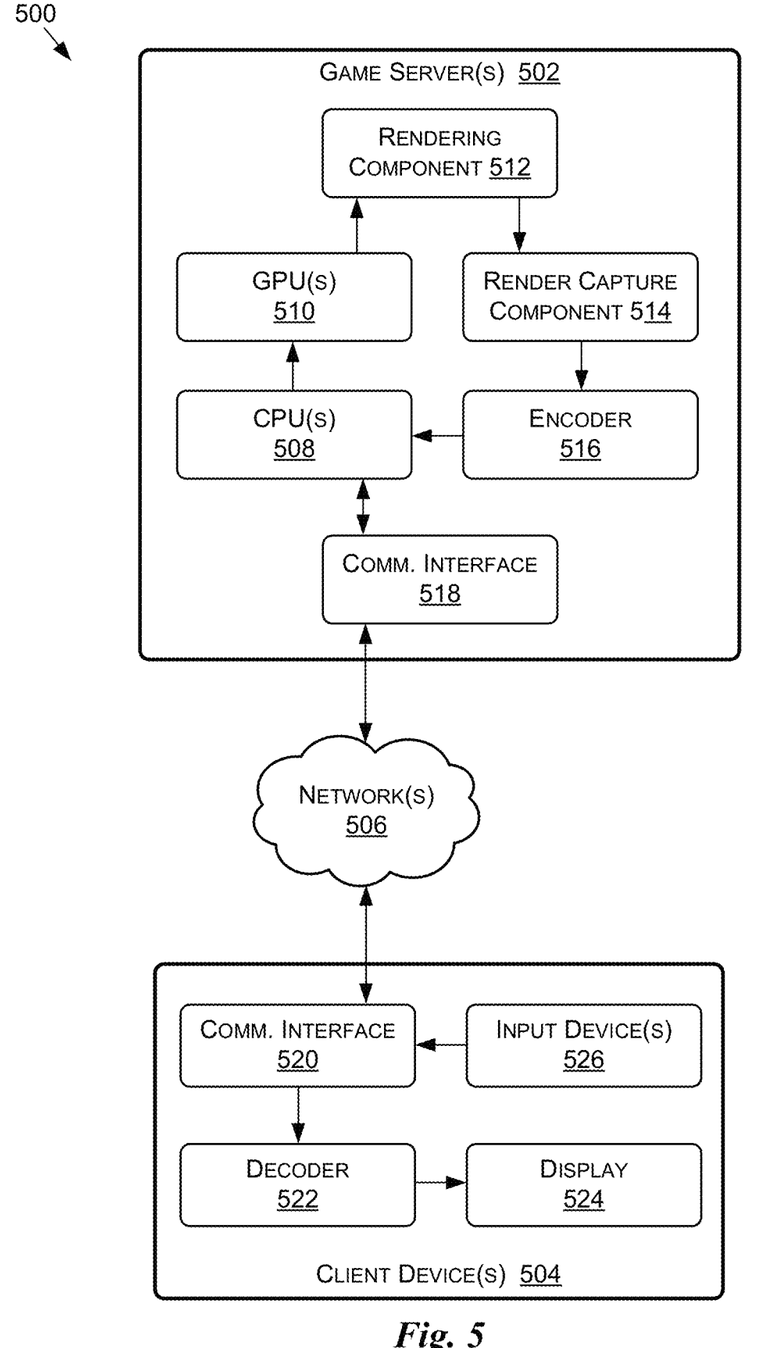
FIG. 5 is a block diagram of an example game streaming system suitable for use in implementing some embodiments of the present disclosure.

FIG. 5 is a block diagram of an example game streaming system suitable for use in implementing some embodiments of the present disclosure.

Figure 6:
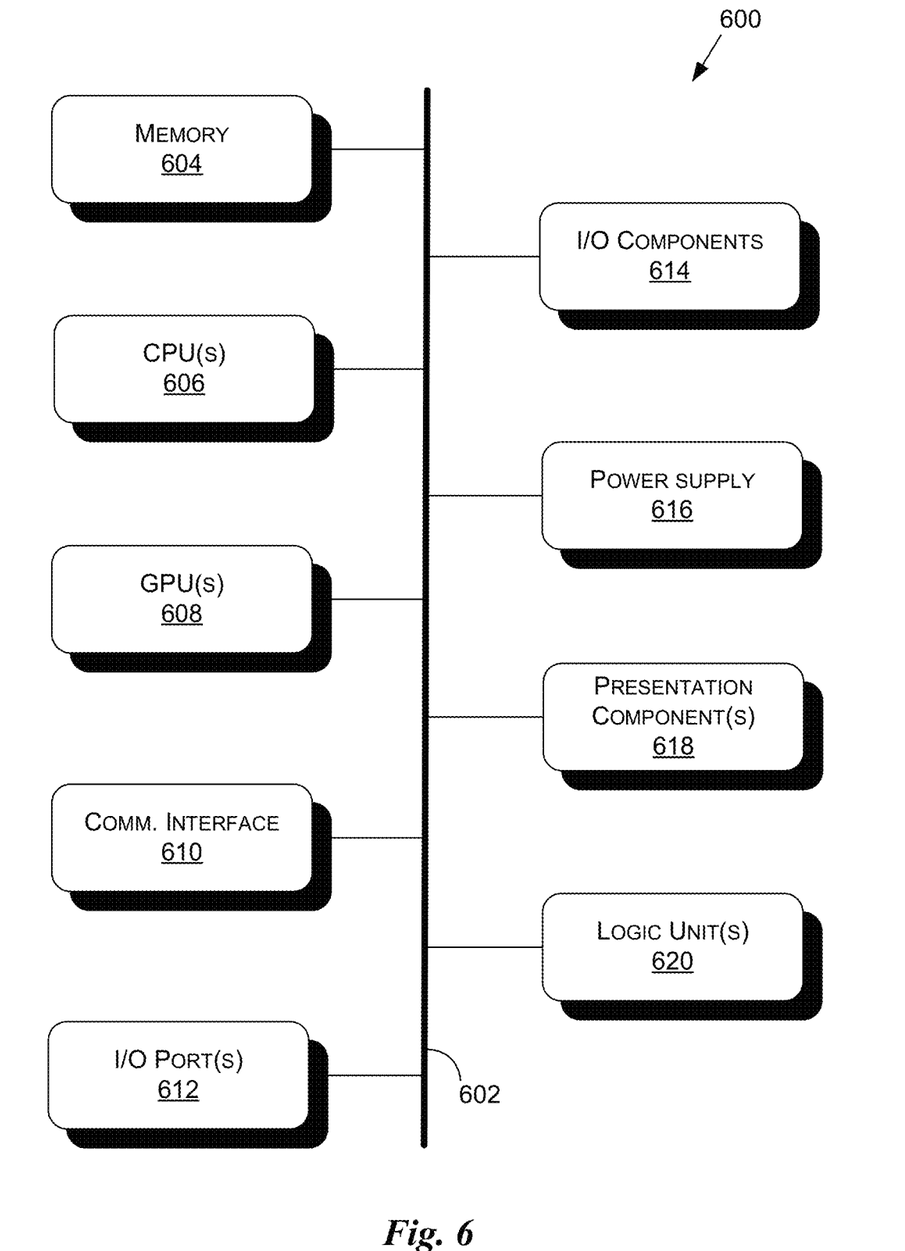
FIG. 6 is a block diagram of an example computing device suitable for use in implementing some embodiments of the present disclosure.

FIG. 6 is a block diagram of an example computing device suitable for use in implementing some embodiments of the present disclosure.

Example Game Streaming System

FIG. 5 is an example system diagram for a game streaming system 500, in accordance with some embodiments of the present disclosure. FIG. 5 includes game server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented.

In the system 500, for a game session, the client device(s) 504 may only receive input data in response to inputs to the input device(s), transmit the input data to the game server(s) 502, receive encoded display data from the game server(s) 502, and display the display data on the display 524. As such, the more computationally intense computing and processing is offloaded to the game server(s) 502 (e.g., rendering—in particular ray or path tracing—for graphical output of the game session is executed by the GPU(s) of the game server(s) 502). In other words, the game session is streamed to the client device(s) 504 from the game server(s) 502, thereby reducing the requirements of the client device(s) 504 for graphics processing and rendering.

For example, with respect to an instantiation of a game session, a client device 504 may be displaying a frame of the game session on the display 524 based on receiving the display data from the game server(s) 502. The client device 504 may receive an input to one of the input device(s) and generate input data in response. The client device 504 may transmit the input data to the game server(s) 502 via the communication interface 520 and over the network(s) 506 (e.g., the Internet), and the game server(s) 502 may receive the input data via the communication interface 518. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 512 may render the game session (e.g., representative of the result of the input data) and the render capture component 514 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 502. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
   accessing a plurality of unlabeled video frames; and
   performing self-supervised hierarchical motion learning by a neural network, using the plurality of unlabeled video frames, wherein the self-supervised hierarchical motion learning progressively learns, in a bottom-up manner, a hierarchy of motion representations having motion features at increasing level of detail.

2. The method of claim 1, wherein at each level above a first level in the hierarchy, motion features for the level are learned by enforcing the motion features to predict future motion features at a previous level.

3. The method of claim 2, wherein a discriminative contrastive loss is used as an objective such that the current level is trained to capture semantic temporal dynamics from the previous level.

4. The method of claim 1, wherein preliminary motion features are determined in a self-supervised manner from the plurality of unlabeled video frames.

5. The method of claim 4, wherein the preliminary motion features are determined by applying video frame reconstruction to the plurality of unlabeled video frames.

6. The method of claim 4, further comprising:
   initializing the self-supervised hierarchical motion learning with the preliminary motion features.

7. The method of claim 1, further comprising:
   performing action recognition learning using the learned motion features.

8. The method of claim 7, wherein the action recognition learning is performed by integrating the learned motion features into a backbone network.

9. The method of claim 8, wherein the learned motion features are integrated with appearance features.

10. A system, comprising:
    a non-transitory memory storage comprising instructions; and
    one or more processors in communication with the memory, wherein the one or more processors execute the instructions to:
    perform self-supervised hierarchical motion learning by a neural network, using a plurality of unlabeled video frames, wherein the self-supervised hierarchical motion learning progressively learns a hierarchy of motion representations having increasing level of detail in a bottom-up manner.

11. The system of claim 10, wherein at each level above a first level in the hierarchy, motion features for the level are learned by enforcing the motion features to predict future motion features at a previous level.

12. The system of claim 10, wherein preliminary motion features are determined in a self-supervised manner from the plurality of unlabeled video frames, and further comprising:
 initializing the self-supervised motion learning with the preliminary motion features.

13. The system of claim 10, wherein the neural network is further configured to:
 perform action recognition learning using the learned motion features.

14. The system of claim 13, wherein the action recognition learning is performed by integrating the learned motion features into a backbone network.

15. The system of claim 14, wherein the learned motion features are integrated with appearance features.

16. A non-transitory computer-readable media storing computer instructions that, when executed by one or more processors, cause the one or more processors to perform a method comprising:
 accessing a plurality of unlabeled video frames; and
 performing self-supervised hierarchical motion learning by a neural network, using the plurality of unlabeled video frames, wherein the self-supervised hierarchical motion learning progressively learns a hierarchy of motion representations having increasing level of detail in a bottom-up manner.

* * * * *